July 1, 1969  R. J. WIGHT  3,452,718
DEVICE FOR LOADING TURKEYS IN TRUCKS
Filed July 3, 1967  Sheet 1 of 3
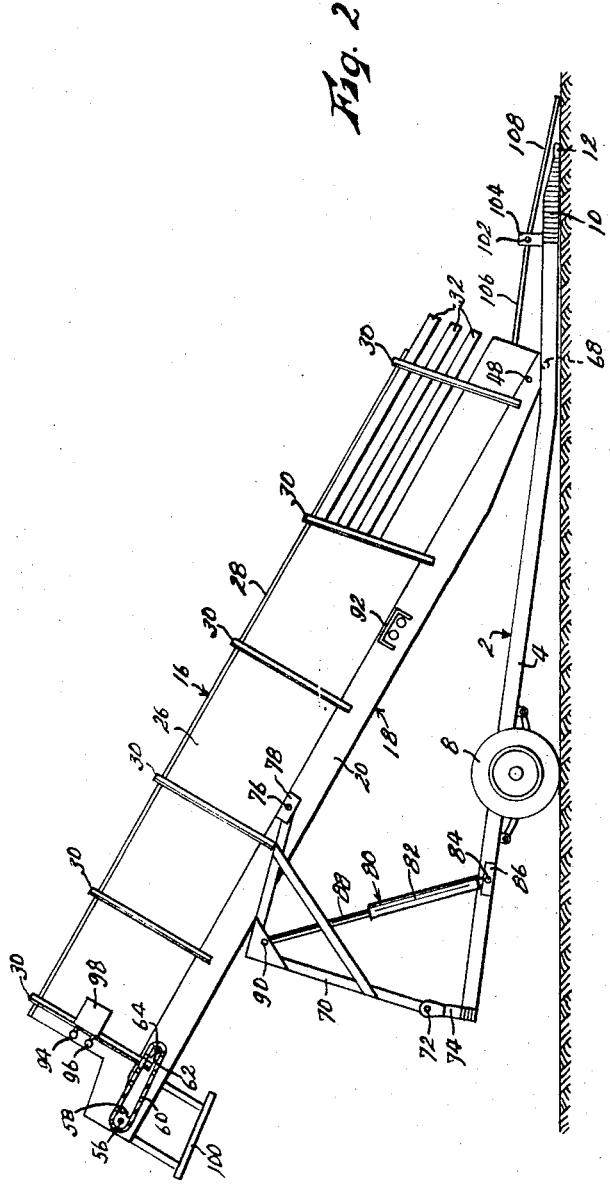
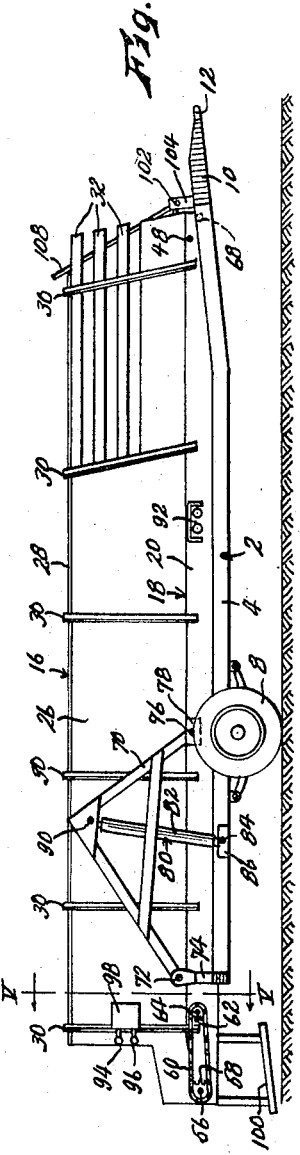
INVENTOR.
Reed J. Wight
BY John A. Hamilton
Attorney.

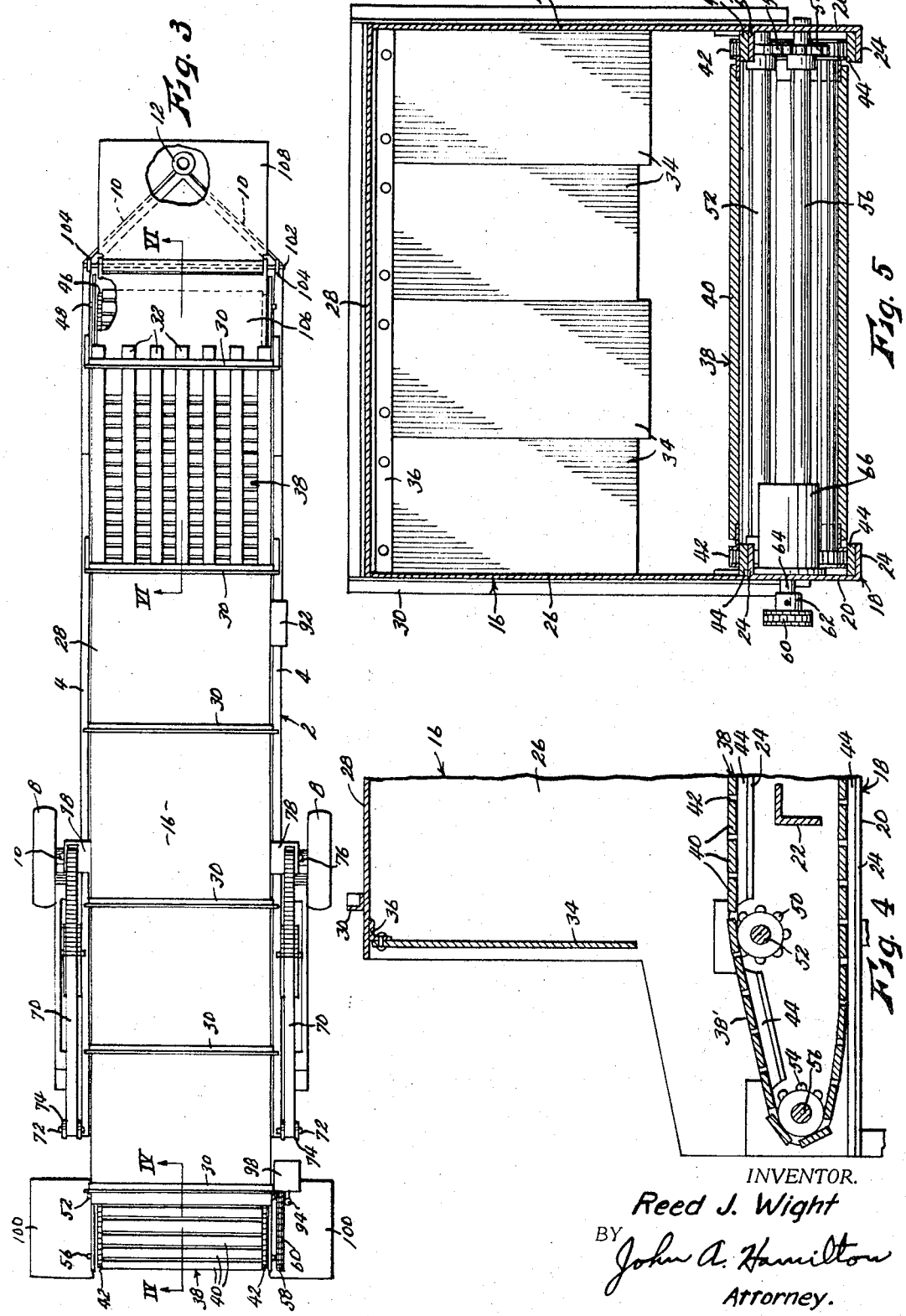

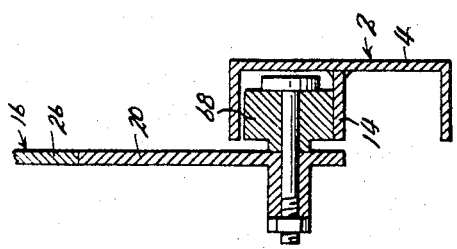
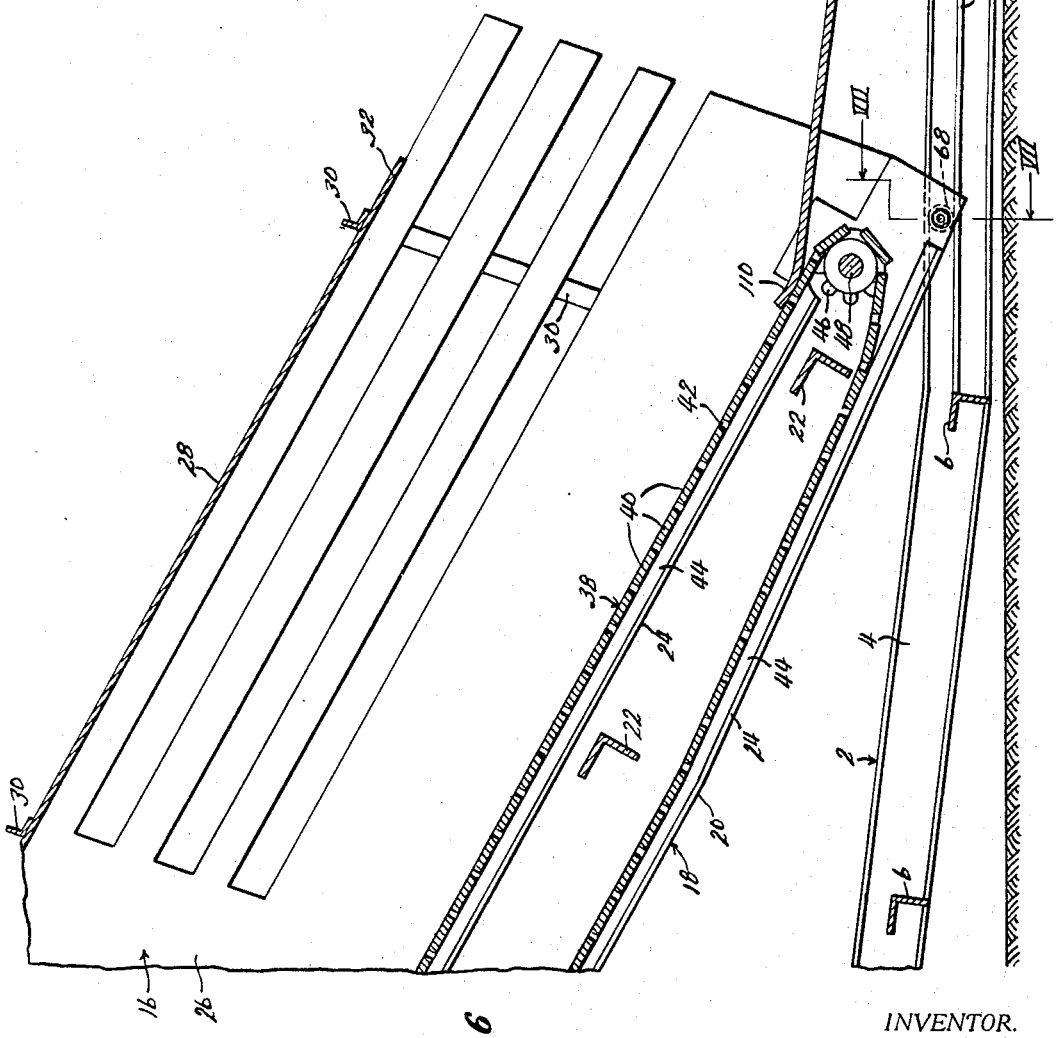

United States Patent Office 3,452,718
Patented July 1, 1969

3,452,718
DEVICE FOR LOADING TURKEYS IN TRUCKS
Reed J. Wight, 2805 Wheelock Ave.,
Ogden, Utah 84403
Filed July 3, 1967, Ser. No. 650,900
Int. Cl. A01h 29/00; E01d 15/12, 15/00
U.S. Cl. 119—82                              9 Claims

ABSTRACT OF THE DISCLOSURE

This application discloses a device for loading turkeys into trucks having a large number of individual coops opening outwardly through a vertical face of the truck body, said device comprising an elongated chute adapted to be disposed with the entry end thereof substantially at ground level to receive live turkeys or other poultry therein and being adjustably tiltable to dispose the exit chute is tilted, thus insuring that the chute will remain body face and closely adjacent thereto, the tilting mechanism being such as to maintain the discharge end of the chute in substantially the same vertical plane at any elevation, and hence in proper relation to the truck face. The floor of said chute constitutes a conveyor belt normally traveling toward the exit end of said chute.

---

This invention relates to new and useful improvements in poultry handling apparatus, and has particular reference to a device for assisting in the loading of turkeys or other poultry into the trucks commonly used for the transportation of live poultry to market. Such trucks usually have large numbers of individual coops mounted thereon having doors opening outwardly at the vertical side planes of the truck body, said coops being arranged in horizontal rows and vertical tiers. Said coops are often stacked to heights of 12–14 feet above the ground, and loading live turkeys therein is not a simple matter, in view of the facts that mature tom turkeys often weigh 30–40 pounds, and that turkeys are notably strong, skittish, stubborn and cantankerous birds having sharp claws and beaks. The usual method of loading them is to catch them individually, then lift and carry them to the coops, using makeshift platforms to reach the higher coops, or to hand the birds up to workmen clinging to, or standing on supports on, the sides of the truck. This is a highly laborious method, requiring considerable time and manpower, and furthermore is not without danger of physical injury both to the workmen and the birds themselves.

Accordingly, the principal object of the present invention is the provision of a device for assisting in the loading of turkeys and the like into trucks of the character described which largely overcomes all of the above enumerated difficulties, in that it is fast, requires little manpower and involves little or no manual lifting or handling of the birds, or danger of physical injuries or damage to the workmen or the birds. Generally, the device includes a wheeled base adapted to be conveniently transported by a truck, tractor or other towing vehicle, an elongated chute or tunnel carried by said base and adapted to be disposed with its forward end directly adjacent the coop face of the truck in which the turkeys are to be loaded and extending outwardly therefrom, and means for tilting said chute whereby the rearward end thereof is maintained substantially at ground level for receiving turkeys therein, and the forward end thereof may be disposed selectively at the level of any desired horizontal row of coops for discharging the birds into said coops. The chute may be aligned with different vertical tiers of coops by moving the coop truck forwardly or rearwardly.

Another object is the provision of a loading device of the character described wherein the chute tilting means is of a novel construction providing that the discharge end of the chute will move substantially vertically as said chute is tilted, thus insuring that the chute will remain in proper relation to the coop face of the truck at any elevation.

A further object is the provision of a loading device of the character described which recognizes and utilizes well known psychological idiosyncrosies of turkeys and poultry in general. For example, the chute is made closed and hence dark for the major portion of its length, since it is well known that the birds tend to "freeze" and remain motionless when entering a dark zone. Hence they do not fight or thrash about in the chute, and there is therefore less danger of their damaging or injuring themselves or each other, or of becoming piled up and jammed or clogged in the chute. Due to this "freezing," however, they would not voluntarily move through the chute, and for this reason the floor of the chute constitutes a conveyor belt moving toward the discharge end thereof. Moreover since it is virtually impossible to herd or drive turkeys into a dark tunnel, the chute is slotted or otherwise formed to admit light from the rearward end thereof to a point forwardly of the rearward end of the conveyor. Thus the birds, seeing light ahead, will move freely forwardly until they are on the conveyor, whereupon the conveyor will move them through the chute despite their natural, and for this purpose desirable, tendency to "freeze" in the dark portions of said chute. Finally, provision is made that the birds emerge suddenly into the light at about the same time they reach the discharge end of the conveyor. The sudden light, plus the loss of footing, creates a strong tendency in the birds to leap forwardly and upwardly. This in many cases carries the birds directly into the desired coop. Workmen may "ride" the chute at the discharge end thereof to grasp each bird to insure that it enters the coop, but usually this is more of a "guiding" action than actual lifting or support.

Other objects are simplicity and economy of construction, efficiency and dependability of operation, and adaptability for use in a wide variety of applications.

With these objects in view, as well as other objects which will appear in the course of the specification, reference will be had to the accompanying drawings, wherein:

FIG. 1 is a side elevational view of a turkey loading device embodying the present invention, shown lowered to its rest position for transportation thereof from place to place, FIG. 2 is a view similar to FIG. 1, but showing the chute elevated to a use position, and with the entry ramp lowered to its use position.

FIG. 3 is a slightly enlarged top plan view of the loading device as shown in FIG. 1, FIG. 4 is an enlarged, fragmentary sectional view taken on line IV—IV of FIG. 3, FIG. 5 is an enlarged sectional view taken on line V—V of FIG. 1, FIG. 6 is an enlarged fragmentary sectional view taken on line VI—VI of FIG. 3, but with the chute elevated as shown in FIG. 2, and FIG. 7 is an enlarged fragmentary sectional view taken on line VII—VII of FIG. 6.

Like reference numerals apply to similar parts throughout the several views, and the numeral 2 applies generally to the carriage or base of the device forming the subject matter of the present invention, said carriage including a pair of parallel side rails 4 connected at intervals along their length by horizontal cross bars 6 (see FIG. 6), said side rails being of channel-shaped cross-sectional contour. Said carriage is supported adjacent its forward end by a pair of ground-engaging wheels 8 disposed respectively at opposite sides of the carriage for coaxial rotation on a horizontal transverse axis. At the rearward end of the carriage, side rails 4 converge inwardly as indicated at 10 and are affixed to a ring 12 or the like, by means of which the carriage may be hitched to a pickup truck, tractor, or other towing vehicle for convenient and easy transportation from place to place. Just forwardly of converging portions 10 of side rails 4, each side rail is provided with a longitudinally extending track member 14 at the inner face thereof (see FIGS. 6 and 7).

Carriage 2 supports a chute designated generally by the numeral 16, said chute being elongated and normally extending when in its lowered or transport position as shown in FIG. 1, from a point just forward of the converging portions 10 of carriage rails 4 to a point forward of the forward end of the carriage. In this position, the chute rests on cross bars 6 of carriage 2. The chute consists of a base frame 18 including a pair of parallel side rails 20 extending longitudinally of the chute and rigidly interconnected at intervals along their length by horizontal cross bars 22, said side rails being channel-shaped in cross-sectional contour with inwardly directed flanges 24, a side wall 26 extending vertically upwardly from each of said side rails, and a top wall 28, said side and top walls being supported at intervals along the length of the chute by brackets 30 of inverted U-shape affixed at their lower ends to side rails 20. Said brackets are disposed externally of the chute to avoid internal projections on which the birds might injure themselves. The side and top walls of the chute are continuous and imperforate, whereby to darken the interior thereof, except at the extreme rearward portion thereof, where said walls are slotted as indicated at 32 to admit light for a purpose to be more fully described below. The forward end of the chute is darkened by a divided curtain 34 (see FIGS. 4 and 5) affixed at its upper edge to a rail 36 affixed to top wall 28, and depending freely therefrom. Said curtain is freely pliable, and may be formed of fabric, rubber, or other suitable material.

The floor of chute 16 is formed by an endless conveyor belt 38 formed by transversely extending slats 40 formed of wood or other suitable material, preferably spaced apart to permit feathers, droppings and other debris to fall through. The ends of said slats are connected to a pair of sprocket chains 42 disposed respectively at opposite sides of the chute. Said chains are supported slidably on slides 44 formed of wood or the like and mounted on the flanges 24 of chute side rails 20. At the rearward end of the chute, chains 42 are trained about a pair of sprocket wheels 46 fixed on a horizontal transverse shaft 48 extending between and journalled in side rails 20. At the forward end of the chute, chains 42 are trained about a pair of sprocket wheels 50 mounted on a shaft 52 and a pair of sprocket wheels 54 mounted on a shaft 56. Shafts 52 and 56 are horizontal and transverse to the chute, with shaft 56 disposed somewhat forwardly from and a little lower than shaft 52, whereby the extreme forward end portion of the upper reach of the conveyor, further designated by the numeral 38', is inclined forwardly and downwardly as best shown in FIG. 4. This provides that the "exit" end of the conveyor will be more nearly horizontal when the chute is elevated as shown in FIG. 2. Shaft 56 extends outwardly from one of side rails 20, and has mounted thereon a sprocket 58 which is interconnected by sprocket chain 60 to a sprocket 62 mounted on the drive shaft 64 of a hydraulic motor 66 mounted between side rails 20 and between the upper and lower reaches of conveyor belt 38.

Chute 16 is supported at its rearward end by a pair of rollers 68 carried respectively by chute side rails 20 at the rearward ends thereof, said rollers being coaxial on a horizontal transverse axis and having rolling contact with the track members 14 of the associated carriage side rails 4, whereby the chute can move forwardly and rearwardly with respect to the carriage. The forward end of the chute can be raised or lowered with respect to the carriage by means of a pair of upwardly angled links 70 disposed respectively at opposite sides of the chute and extending generally forwardly and rearwardly. The forward end of each link is pivoted as at 72, to the upper end of a post 74 affixed to the forward end of the associated carriage side rail 4, and the rearward end of each link is pivoted, as at 76, to a bracket 78 affixed to the associated chute side rail 20. The corresponding pivots of the two links are coaxial, and extend horizontally and transversely of the chute. Pivots 76 are preferably disposed forwardly of the center of gravity of the chute. Each link 70 may be pivoted by means of a hydraulic ram 80 consisting of a hydraulic cylinder 82 pivoted at its lower end, as at 84, to a bracket 86 fixed to the associated carriage side rail 4, in which is operatively mounted a piston (not shown) affixed to a piston rod 88 which extends upwardly from said cylinder and is pivoted at its free end, as at 90, to the associated link 70 at the angle thereof. It will be seen from FIG. 1 that by extension of these rams, the forward end of the chute may be elevated as shown in FIG. 2. Hydraulic rams 80, as well as hydraulic motor 66, may be supplied with operating hydraulic fluid in any suitable manner. As shown, one of chute side rails 20 is provided with hydraulic connections 92 to which flexible hoses from the hydraulic system of a truck, tractor or the like may be joined. The conduit system from connections 92 to the hydraulic motor and rams are standard, and are not shown, except that they are controlled by handles 94 and 96 of a control valve assembly 98 mounted at the rearward end of the chute at one side thereof, handle 94 being operable to actuate motor 66 to turn it selectively in either direction, and handle 96 being operable selectively to extend or retract hydraulic rams 80 simultaneously. At the forward end of the chute, at each side thereof and below the level of side rails 20, an outwardly projecting platform 100 is mounted on each of side rails 20. These platforms may be detachably mounted if desired. A workman will normally stand on each of said platforms during use of the device, so as to ride up and down with the forward end of the chute. One of them will have access to valve handles 94 and 96.

At the rearward end of carriage 2, just rearwardly of chute 18, a pivot rod 102 extends horizontally and transversely between a pair of upstanding brackets 104 affixed respectively to carriage side rails 4. A pair of ramps 106 and 108 are pivoted on said rod. Ramp 106 may be termed a bridge ramp, and extends forwardly to rest on the upper surface of conveyor belt 38, being curved upwardly at its forward edge, as indicated at 110 (FIG. 6) to prevent interference thereof with the slats of the belt in the event the belt is reversed to travel rearwardly. Ramp 108 may be termed an entry ramp, and normally extends rearwardly from rod 102 to rest at its rearward edge on the ground as shown in FIG. 2, covering the converging portions 10 of side rails 4, and hitch ring 12. When not in use, ramp 108 may be pivoted upwardly and forwardly to engage the rearward end of top chute wall 28, as shown in FIG. 1.

In use, the device is positioned with chute 16 extending outwardly at right angles from the vertical side wall of a truck through which the poultry coops of said truck open, with the forward end of the chute directly adjacent said truck face, and entry ramp 108 is lowered to the ground as shown in FIG. 2. Also, suitable vertical panels may be extended rearwardly from the rearward end of each chute side wall 26 of the chute, to any desired distance, whereby to form corrals and runways for directing the poultry to the rearward end of the chute. Such panels could be attached to the chute and to posts driven into the ground. However, said panels form no essential element of the present invention, and are therefore not shown.

The workman standing on one of platforms 100 then operates valve handle 94 to set the upper reach of conveyor belt 38 in forward motion, and operates valve handle 96 to extend hydraulic rams 80 to pivot the forward end of chute 16 upwardly until it is disposed at the level of the horizontal row of coops into which it may be desired to load the poultry. Since the poultry must be moved from the chute to the coops, it is important that the forward end of the chute moves substantially vertically as it is elevated, in order that it will remain conveniently close to the face of the truck. If the chute were mounted in the carriage at its rearward end on a simple pivot, and its forward end elevated, said forward end would move rearwardly away from the truck face. Accordingly, rollers 68, tracks 14 and link 70 form an extremely important feature of the invention. It will be seen that the rearward component of the movement of the forward end of the chute, considering only its pivotal movement about the axis of rollers 68, is counteracted by the concurrent forward component of the movement of pivots 76 at the rearward ends of links 70, considering the movement of said links about pivots 72. Hence, as the forward end of the chute is elevated, the entire chute is shifted bodily forwardly, so that the forward end thereof moves substantially vertically rather than in an arc, as may be appreciated from a comparison of FIGS. 1 and 2. The forward bodily movement of the chute is permitted by movement of rollers 68 along tracks 14 of the carriage.

The poultry is then driven or herded into the rearward end of the chute, over ramps 108 and 106, ramp 106 providing a bridge to conveyor belt 38 regardless of the degree to which said conveyor belt may have been shifted forwardly by forward movement of the entire chute. In this connection, it is well known to poultrymen that it is virtually impossible to drive poultry, particularly turkeys, into a dark tunnel, since they simply balk and refuse to enter, apparently because of fear or nervousness. However, they will move forwardly as long as they can see light ahead. For this reason, the side and top walls of the chute are slotted as shown to admit light, the slotted portion extending somewhat forwardly of the rearward end of conveyor 38. Thus the birds move forward freely, or at least can be driven, until they walk onto the conveyor. The change of footing startles the birds, and they of course immediately enter into the darkened portion of the chute, which further frightens them. As a result, they tend strongly to "freeze" and remain motionless. The fact that they also refuse to walk or be driven makes no difference as far as their transportation is concerned, since they are then being moved by the conveyor, and their immobilization in the chute serves the additional valuable function that they do not fight, struggle or thrash about while in the chute, which they probably would do if the chute were open and brightly lighted, and which quite often results in injury or damage to the birds. The curtain 34 at the forward end of the chute tends to prevent them from seeing light, which to them represents freedom and which would therefore cause them to fight forwardly toward that light, until they force the curtain members aside with their own bodies. The curtain members could of course be of any desired length, and could depend all the way to the conveyor belt, but apparently the line of sight of the birds when "frozen" is forward and upward, and no decrease in the effectiveness of the curtain occurs when terminated somewhat above the conveyor, as shown. As the birds emerge suddenly into the light through the curtain, they sense freedom and tend to leap forwardly and upwardly. Workmen standing on platforms 100 preferably grasp each bird and direct it to make certain it enters the desired coop and may lift it into the coop if necessary. However, due to the tendency of the birds to leap forward, as just described, the workmen usually need only to "guide" the birds into the coops, rather than to lift them. Many birds will leap as soon as they emerge into the light, and virtually all will do so when they start to lose their footing by reason of the conveyor belt passing around sprockets 54. The workmen cannot afford to wait till the birds pass over sprockets 54 to determine if they will leap, and it has been found that the inclination of portion 38' of the conveyor, which occurs when the belt passes over sprockets 50, also assists in causing the birds to leap. Apparently the change of footing, even when comparatively slight, imparts a sufficient sense of insecurity to the birds to render leaping more likely, particularly when it occurs at the same moment the birds emerge through curtain 34, as shown.

In the unlikely event that the birds should become clogged in the chute, it may be desirable to reverse the conveyor movement to assist in clearing the jam. It is for this reason that hydraulic motor 66 is made reversible by valve handle 94. By operating valve handle 96, the discharge end of the chute may be properly aligned with any coop in a vertical tier of coops on the truck. By moving the truck itself forwardly or rearwardly in a direction at right angles to the general extent of the chute, any desired vertical tier of coops on the truck can be aligned with the chute.

While I have shown and described a specific embodiment of my invention, it will be readily apparent that many minor changes of structure and operation could be made without departing from the spirit of the invention.

What I claim as new and desire to protect by Letters Patent is:

1. A device for loading turkeys into trucks comprising:
    (a) a carriage,
    (b) an elongated chute having forward and rearward ends carried by said carriage, and
    (c) means mounted on said carriage and movable to tilt said chute relative to said carriage whereby the rearward end of said chute remains substantially at ground level for receiving turkeys therein, and whereby the forward end of said chute may be disposed at variable distances above the ground to discharge said turkeys into coops carried by a truck, said tilting means including means operable to maintain the forward end of said chute substantially in the same vertical plane as said chute is tilted..

2. A device as recited in claim 1 wherein the rearward end of said chute is supported on said carriage for movement longitudinal to said chute, and wherein said tilting means comprises:
    (a) a link pivoted to said carriage on a horizontal axis transverse to said chute and normally extending rearwardly from said pivot, said link being pivoted at its rearward end to said chute on a horizontal axis transverse to said chute, and spaced forwardly from the rearward end of said chute, and
    (b) means carried by said carriage for pivoting said link upwardly and forwardly relative to said carriage.

3. A device as recited in claim 2 including a pair of said links disposed respectively at opposite sides of said chute, and wherein said link pivoting means comprises a pair of hydraulic rams each pivoted at its opposite ends respectively to said carriage and one of said links, the corresponding pivots of both of said links and hydraulic rams being coaxial, horizontal, and transverse to the chute.

4. A device as recited in claim 1 wherein the floor of said chute constitutes a conveyor, and with the addition of means for driving said conveyor whereby it is caused to move toward the forward end of said chute.

5. A device as recited in claim 4 wherein said chute is provided with side and top walls rendering the interior thereof substantially dark along the major portion of the length thereof.

6. A device as recited in claim 4 wherein said chute is provided with side and top walls rendering the interior thereof substantially dark along the major portion of the length thereof, said walls being formed with apertures therethrough, whereby to admit light to the interior of the chute, from the rearward end of said chute to a point spaced forwardly from the rearward end of said conveyor.

7. A device as recited in claim 5 with the addition of a flexible curtain depending from said top chute wall adjacent the forward end thereof, whereby to inhibit the entry of light into the forward end portion of said chute.

8. A device as recited in claim 4 wherein said conveyor comprises an endless conveyor belt the upper reach of which constitutes the floor of said chute, said belt extending parallel to the chute axis through a major portion of the chute length, and having a portion thereof at the forward end of said chute inclined downwardly with respect to the axis of the chute.

9. A device as recited in claim 7 wherein said curtain is disposed rearwardly of the forward end of said conveyor, wherein said conveyor moves parallel to the chute axis at all points behind said curtain, and wherein said conveyor is inclined downwardly and forwardly with respect to said chute axis forwardly of said curtain.

References Cited

UNITED STATES PATENTS

| | | | |
|---|---|---|---|
| 1,090,670 | 3/1914 | Zimmerman | 198—114 |
| 2,754,802 | 7/1956 | Patterson | 119—82 |
| 2,941,813 | 6/1960 | Price | 280—30 |
| 3,095,591 | 7/1963 | Buck | 104—48 X |
| 3,159,294 | 12/1964 | Forsythe | 214—505 |
| 3,389,780 | 6/1968 | Jerome | 119—82 X |

ALDRICH F. MEDBERRY, *Primary Examiner.*

U.S. Cl. X.R.

14—72; 198—114; 214—85; 280—30